United States Patent [19]

Hirschmann et al.

[11] Patent Number: 5,997,767
[45] Date of Patent: Dec. 7, 1999

[54] STN LIQUID-CRYSTAL DISPLAY

[75] Inventors: Harald Hirschmann; Clarissa Weller, both of Darmstadt; Volker Reiffenrath, Rossdorf, all of Germany

[73] Assignee: Merck Patent Gesellschaft mit beschrankter Haftung, Germany

[21] Appl. No.: 09/122,885

[22] Filed: Jul. 28, 1998

[30] Foreign Application Priority Data

Jul. 29, 1997 [DE] Germany .................. 197 32 502

[51] Int. Cl.$^6$ .......................... C09K 19/30; C09K 19/06; C09K 19/12; C09K 19/20
[52] U.S. Cl. .................... 252/299.63; 252/299.6; 252/299.66; 252/299.67; 252/299.01; 349/186
[58] Field of Search ............. 252/299.63, 299.66, 252/299.67, 299.6, 299.01; 349/186

[56] References Cited

U.S. PATENT DOCUMENTS

| | | | |
|---|---|---|---|
| 4,528,114 | 7/1985 | Petrzilka et al. | 252/299.6 |
| 5,308,538 | 5/1994 | Weber et al. | 252/299.61 |
| 5,387,369 | 2/1995 | Weber et al. | 252/299.01 |
| 5,714,087 | 2/1998 | Pausch et al. | 252/299.01 |
| 5,876,726 | 3/1999 | Weber et al. | 252/299.01 |

FOREIGN PATENT DOCUMENTS 816332  1/1998  European Pat. Off. .
2111992  7/1983  United Kingdom .

*Primary Examiner*—C. H. Kelly
*Attorney, Agent, or Firm*—Millen, White, Zelano, & Branigan, P.C.

[57] ABSTRACT

The invention relates to supertwist liquid-crystal displays (SLCDs) having very short response times and good steepnesses and angle dependences, and to the nematic liquid-crystal mixtures according to the invention used therein, which are distinguished by the fact that they comprise at least one compound of the formula IA

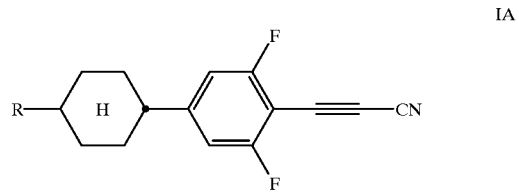

and at least one compound of the formula IB

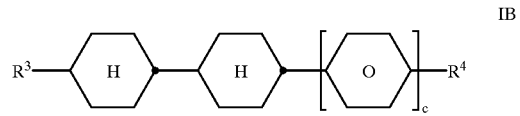

in which R, $R^3$, $R^4$ and C are as defined herein.

12 Claims, No Drawings

STN LIQUID-CRYSTAL DISPLAY

The invention relates to supertwist liquid-crystal displays (SLCDs or STN displays) having very short response times and good steepnesses and angle dependencies, and to the nematic liquid-crystal mixtures according to the invention used therein.

SLCDs as defined in the preamble are known, for example from EP 0 131 216 B1; DE 34 23 993 A1; EP 0 098 070 A2; M. Schadt and F. Leenhouts, 17th Freiburg Congress on Liquid Crystals (8.-10.04.87); K. Kawasaki et al., SID 87 Digest 391 (20.6); M. Schadt and F. Leenhouts, SID 87 Digest 372 (20.1); K. Katoh et al., Japanese Journal of Applied Physics, Vol. 26, No. 11, L 1784-L 1786 (1987); F. Leenhouts et al., Appl. Phys. Lett. 50 (21), 1468 (1987); H. A. van Sprang and H. G. Koopman, J. Appl. Phys. 62 (5), 1734 (1987); T. J. Scheffer and J. Nehring, Appl. Phys. Lett. 45 (10), 1021 (1984), M. Schadt and F. Leenhouts, Appl. Phys. Lett. 50 (5), 236 (1987) and E. P. Raynes, Mol. Cryst. Liq. Cryst. Letters Vol. 4 (1), pp. 1–8 (1986). The term SLCD here covers any more highly twisted display element with a value for the twist angle of between 160° and 360°, such as, for example, the display elements of Waters et al. (C. M. Waters et al., Proc. Soc. Inf. Disp. (New York) (1985) (3rd Intern. Display Conference, Kobe, Japan), STN-LCDs (DE-A 35 03 259), SBE-LCDs (T. J. Scheffer and J. Nehring, Appl. Phys. Lett. 45 (1984) 1021), OMI-LCDs (M. Schadt and F. Leenhouts, Appl. Phys. Lett. 50 (1987), 236, DST-LCDs (EP-A 0 246 842) or BW-STN-LCDs (K. Kawasaki et al., SID 87 Digest 391 (20.6)).

SLCDs of this type are distinguished, in comparison to standard TN displays, by significantly better steepnesses of the electrooptical characteristic line and consequently better contrast values, and by significantly less angle dependence of the contrast. Of particular interest are SLCDs having very short response times, in particular also at relatively low temperatures. In order to achieve short response times, the rotational viscosities of the liquid-crystal mixtures were hitherto optimized using usually monotropic additives having relatively high vapour pressure. However, the response times achieved were not adequate for all applications.

In order to achieve a steep electrooptical characteristic line in SLCDs, the liquid-crystal mixtures should have relatively large values for $K_3/K_1$ and relatively small values for $\Delta\epsilon/\epsilon\perp$.

In addition to optimization of the contrast and the response times, further important requirements are made of mixtures of this type:
1. A broad d/p window
2. High long-term chemical stability
3. High electrical resistance
4. Low frequency and temperature dependence of the threshold voltage.

The parameter combinations achieved are still far from adequate, in particular for high-multiplex, but also for low- and medium-multiplex STNs (1/400). This is in some cases attributable to the fact that the various requirements are affected in opposite manners by material parameters.

There thus continues to be a great demand for SLCDs, in particular for high-resolution displays (XGA), having very short response times and at the same time a large operating temperature range, high characteristic line steepness, good angle dependence of the contrast and low threshold voltage which meet the abovementioned requirements.

The invention has the object of providing SLCDs which do not have the abovementioned disadvantages, or only do so to a lesser extent, and at the same time have very good response times, in particular at low temperatures, and very good steepnesses.

It has now been found that this object can be achieved if nematic liquid-crystal mixtures are used which comprise compounds of the formula IA

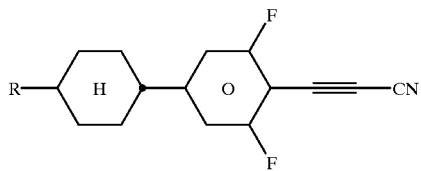

in combination with compounds of the formula IB

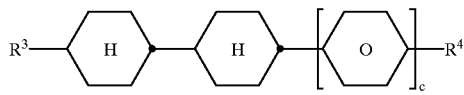

in which
R is an alkyl, alkoxy or alkenyl group having 1 to 12 carbon atoms, in which, in addition, one or two non-adjacent $CH_2$ groups may be replaced by —O—, —CH═CH—, —CO—, —OCO— or —COO— in such a way that O atoms are not linked directly to one another,
$R^3$ is an alkenyl group having 2 to 7 carbon atoms,
$R^4$ is R or $R^3$, and
c is 0 or 1.

The use of compounds of the formulae IA and IB in the mixtures for SLCDs according to the invention produces
high steepness of the electro-optical characteristic line
low temperature dependence of the threshold voltage and
very fast response times, in particular at low temperatures.

The compounds of the formulae IA and IB significantly shorten, in particular, the response times of SLCD mixtures while simultaneously increasing the steepness and retaining the low temperature dependence of the threshold voltage.

Furthermore, the mixtures according to the invention are distinguished by the following advantages:
they have low viscosity,
they have low temperature dependence of the threshold voltage and the operating voltage, and
they effect long storage times of the display at low temperatures.

The invention thus relates to a liquid-crystal display containing
two outer plates which, together with a frame, form a cell,
a nematic liquid-crystal mixture of positive dielectric anisotropy which is present in the cell,
electrode layers with alignment layers on the insides of the outer plates,
a pretilt angle between the longitudinal axis of the molecules at the surface of the outer plates and the outer plates of from about 0 degree to 30 degrees, and
a twist angle of the liquid-crystal mixture in the cell from alignment layer to alignment layer with a value of between 22.5° and 600°,
a nematic liquid-crystal mixture consisting of
a) 20–90% by weight of a liquid-crystalline component A consisting of one or more compounds having a dielectric anisotropy of greater than +1.5;
b) 10–80% by weight of a liquid-crystalline component B consisting of one or more compounds having a dielectric anisotropy of between −1.5 and +1.5;

c) 0–20% by weight of a liquid-crystalline component D consisting of one or more compounds having a dielectric anisotropy of below −1.5, and d) if desired, an optically active component C in such an amount that the ratio between the layer thickness (separation of the outer plates) and the natural pitch of the chiral nematic liquid-crystal mixture is from about 0.2 to 1.3, characterized in that component A comprises at least one compound of the formula IA

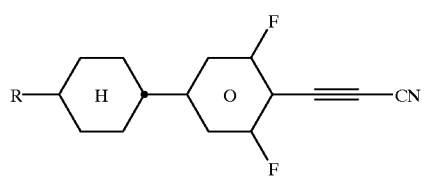

IA in which

R is an alkyl, alkoxy or alkenyl group having 1 to 12 carbon atoms, in which, in addition, one or two non-adjacent $CH_2$ groups may be replaced by —O—, —CH=CH—, —CO—, —OCO— or —COO— in such a way that O atoms are not linked directly to one another, and component B comprises at least one compound of the formula IB

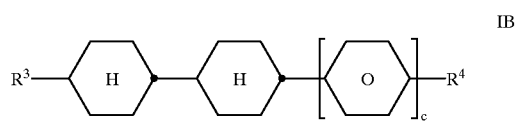

IB in which $R^3$ is an alkenyl group having 2 to 7 carbon atoms, $R^4$ is R or $R^3$, and c is 0 or 1.

The invention also relates to corresponding liquid-crystal mixtures for use in SLCDs, in particular in medium- and low-multiplexed SLCDs.

The formula IB covers the following compounds

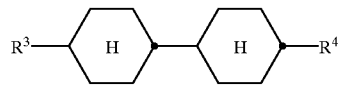

IB1

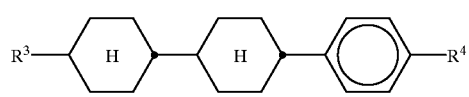

IB2 in which $R^3$ and $R^4$ are as defined for the formula IB. Particular preference is given to compounds of the formulae IB1 and IB2, in which $R^3$ is 1E-alkenyl or 3E-alkenyl having 2 to 7 carbon atoms.

Particularly preferred compounds of the formula IB1 are those of the subformulae IB1-1 to IB1-3

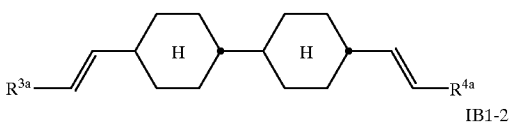

IB1-1

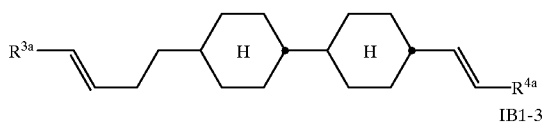

IB1-2

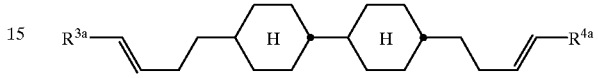

IB1-3 in which $R^{3a}$ and $R^{4a}$ are each, independently of one another, H, $CH_3$, $C_2H_5$ or n-$C_3H_7$.

Particular preference is given to liquid-crystal displays according to the invention in which component B comprises at least two compounds selected from the formulae IB1-1 and IB1-3 in which $R^{3a}$ and $R^{4a}$ each have the same definition.

Particularly preferred compounds of the subformula IB2 are those in which $R^4$ is an alkyl group having 1 to 8 carbon atoms, and $R^3$ is 1E-alkenyl or 3E-alkenyl having 2 to 7 carbon atoms.

Component A preferably comprises, in addition to the compounds of the formula IA, compounds of the formulae II and/or III

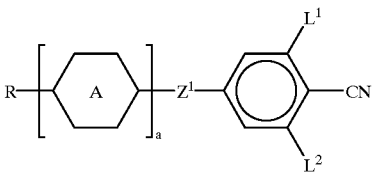

II

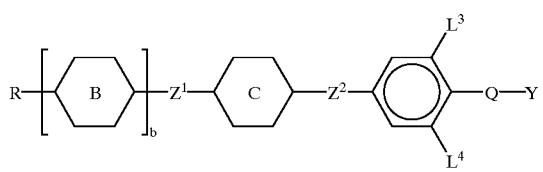

III in which

R is an alkyl, alkoxy or alkenyl group having 1 to 12 carbon atoms, in which, in addition, one or two non-adjacent $CH_2$ groups may be replaced by —O—, —CH=CH—, —CO—, —OCO— or —COO—, in such a way that O atoms are not linked directly to one another,

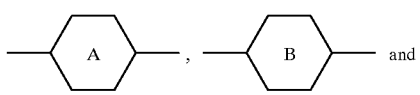

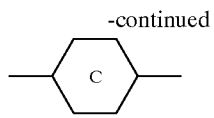

are each, independently of one another,

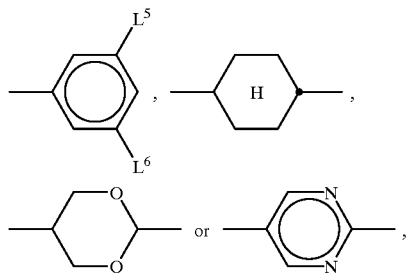

$L^1$ to $L^6$ are each, independently of one another, H or F, $Z^1$ is —COO—, —CH$_2$CH$_2$— or a single bond, $Z^2$ is —CH$_2$CH$_2$—, —COO—, —C≡C— or a single bond, Q is —CF$_2$—, —CHF—, —OCF$_2$—, —OCHF— or a single bond, Y is F or Cl a is 1 or 2, and b is 0 or 1.

Preferred compounds of the formula II conform to the subformulae IIa to IIh:

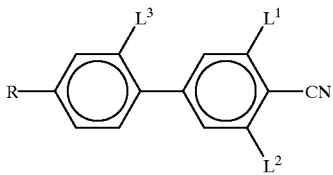
IIa

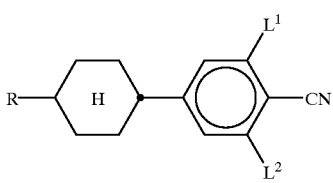
IIb

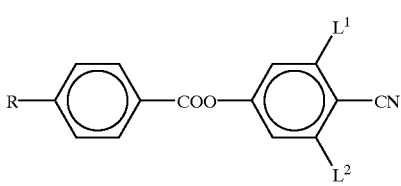
IIc

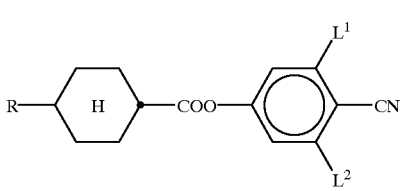
IId

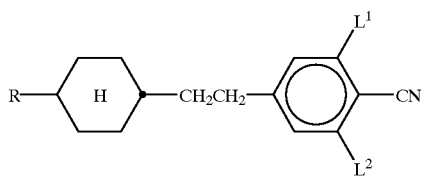
IIe

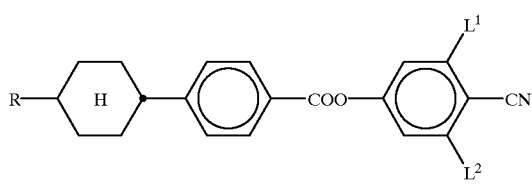
IIf

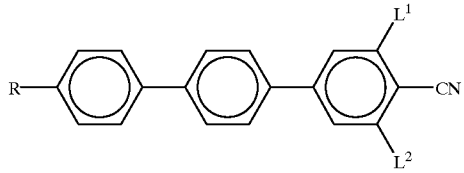
IIg

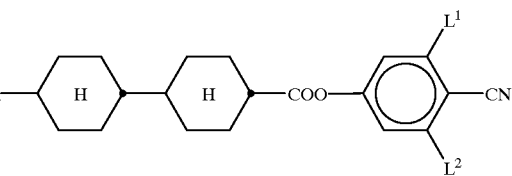
IIh in which R, $L^1$, $L^2$ and $L^3$ are as defined above.

Particular preference is given to mixtures which comprise one or more compounds of the subformulae

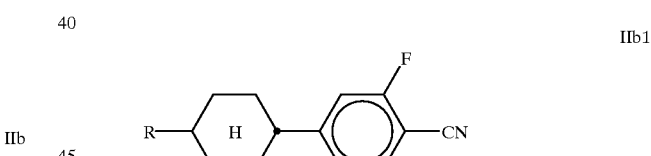
IIb1

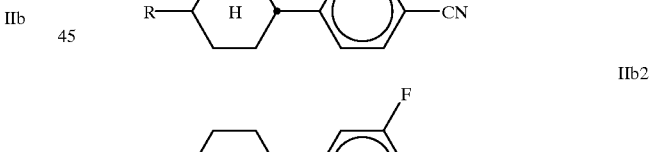
IIb2

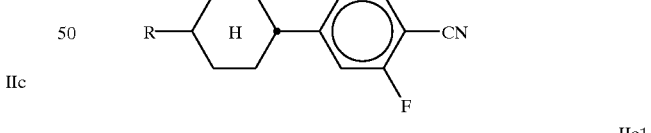
IIc1

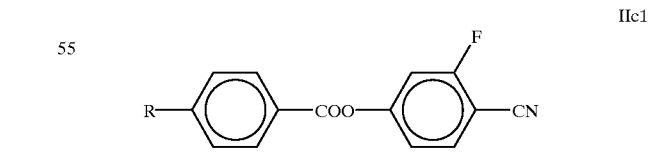
IIc2

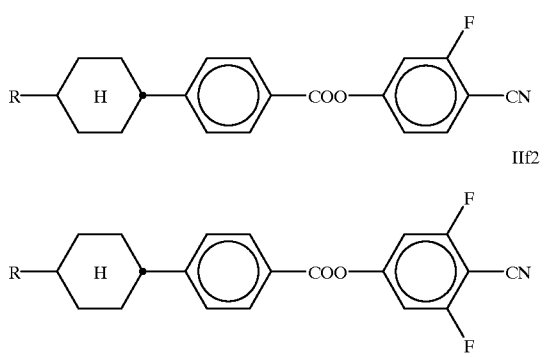

IIf1

IIf2 in which R is as defined above.

Preference is furthermore given to mixtures which comprise one or more compounds of the formula IIh in which $L^2$ is H and $L^1$ is H or F, in particular F.

In a particularly preferred embodiment, component A additionally comprises compounds of the formulae

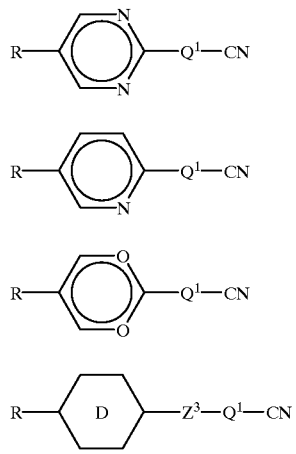

AI

AII

AIII

AIV in which

R is an alkyl, alkoxy or alkenyl group having 1 to 12 carbon atoms, in which, in addition, one or two non-adjacent $CH_2$ groups may also be replaced by —O—, —CH=CH—, —CO—, —OCO— or —COO—, in such a way that O atoms are not linked directly to one another

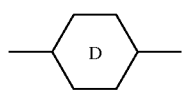

and $Q^1$ are each, independently of one another,

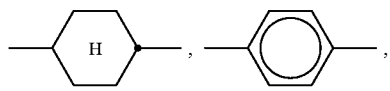

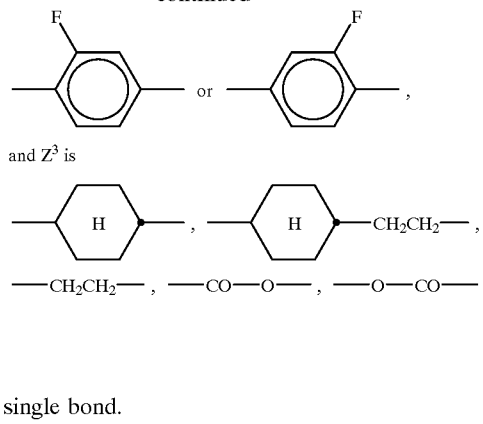

and $Z^3$ is or a single bond.

The mixtures according to the invention preferably comprise one or more polar compounds having a high clearing point selected from the group consisting of the compounds AIV1 to AIV4:

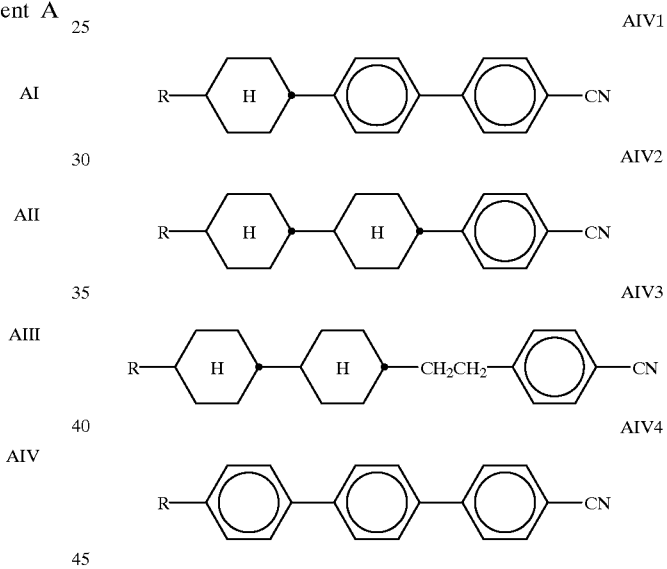

AIV1

AIV2

AIV3

AIV4

In the compounds AIV1 to AIV4, the 1,4-phenylene rings can also be laterally substituted by one or two fluorine atoms. Preferred compounds of this type are the compounds of the formulae AIV1-1, AIV1-2 and AIV1-3:

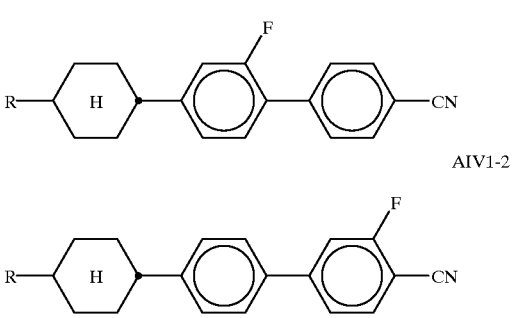

AIV1-1

AIV1-2

AIV1-3
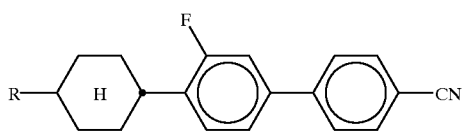
In the mixtures according to the invention which comprise compounds of the formulae AIV1 to AIV4, the proportion of these compounds I is preferably from about 2 to 25%.
Preferred compounds of the formula III conform to the subformulae IIIa–IIIv:
IIIa
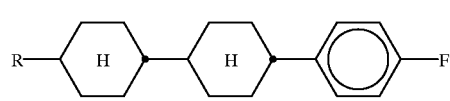
IIIb
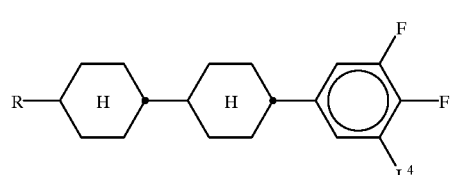
IIIc
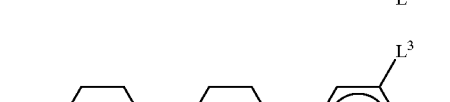
IIId
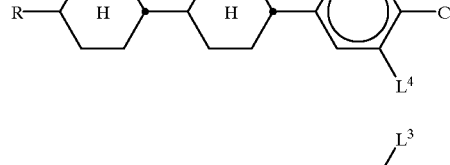
IIIe
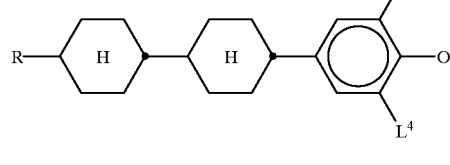
IIIf
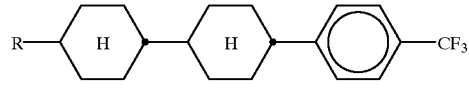
IIIg
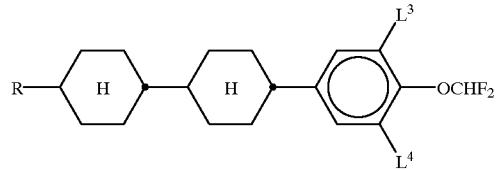
IIIh
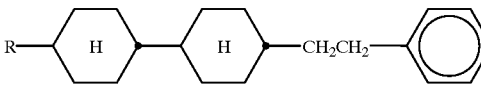
IIIi
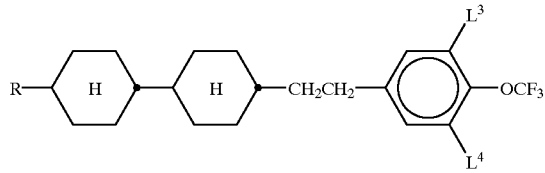
IIIj
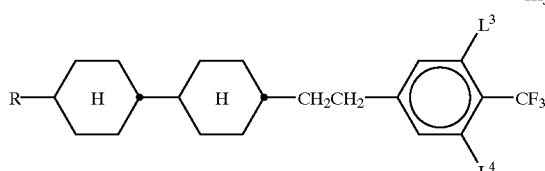
IIIk
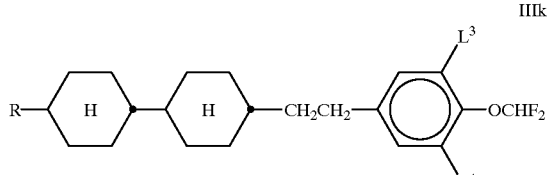
IIIm
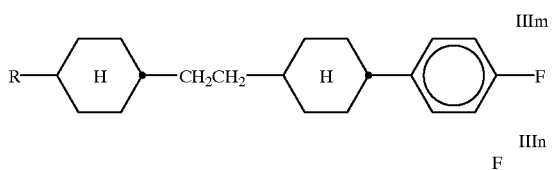
IIIn
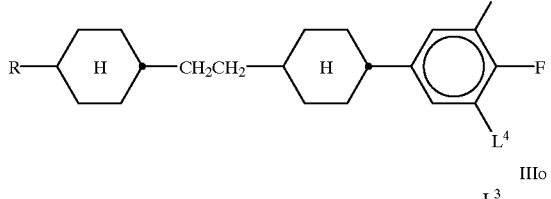
IIIo
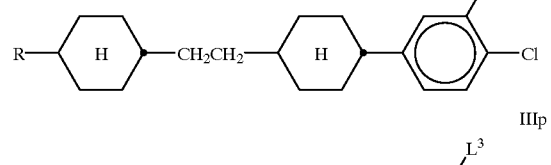
IIIp
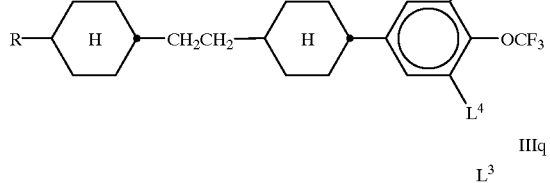
IIIq
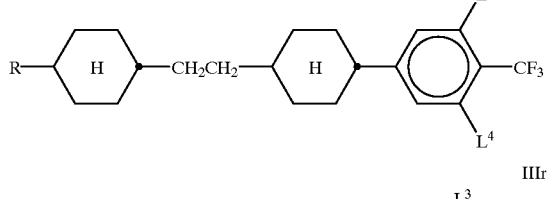
IIIr
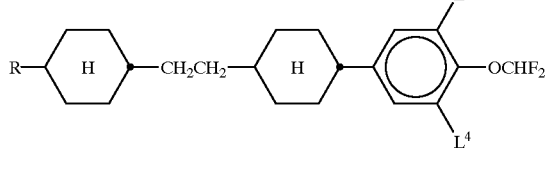

-continued

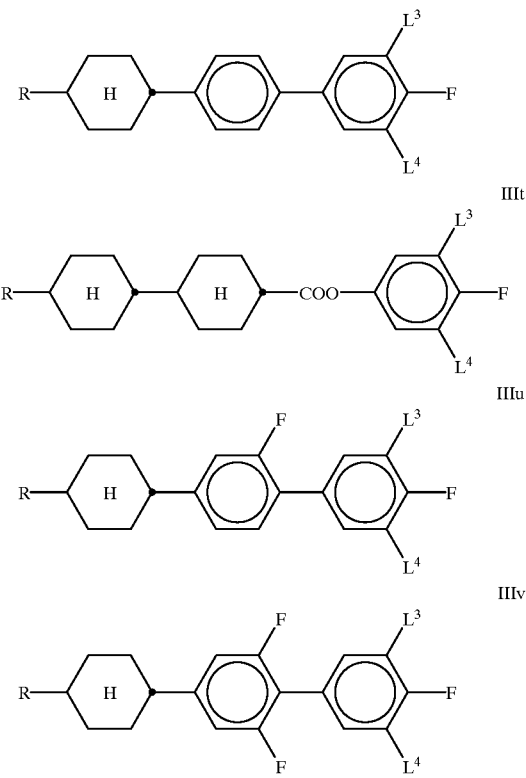

in which R is as defined above, and $L^3$ and $L^4$, independently of one another, are H or F.

Of the compounds of the formulae IIIa to IIIv, particular preference is given to those in which $L^4$ is F, furthermore those in which $L^3$ and $L^4$ are F.

In addition to one or more compounds of the formulae IA and IB, preferred mixtures comprise one, two, three or more compounds of the formulae IIa, IIb, IIc, IIf, IIIb, IIId, IIIf, IIIh, IIIi, IIIm, IIIs, IIIt or IIIu, preferably one or more compounds of the formula IIIb, IIId, IIIh, IIIt or IIIu, and from one to four compounds of the formulae IA and IB and from one to three compounds of the formulae IIa, IIb and/or IIc.

In the preferred compounds of the subformulae to the formulae II and III mentioned above and below, R, $R^1$ and $R^2$, unless stated otherwise, are preferably straight-chain alkyl, alkenyl or alkoxy, in particular alkyl, having 1 to 12 carbon atoms, in particular having 1 to 7 carbon atoms.

Preference is furthermore given to mixtures which comprise one or more compounds of the subformula IIIb1.

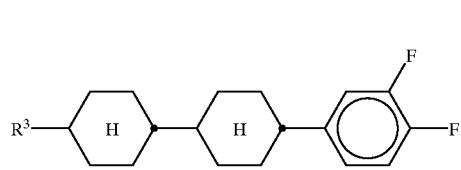

in which $R^3$ is as defined in the formula IB.

In the compounds of the formula IIIb1, $R^3$ is particularly preferably vinyl, 1E-propenyl, 1E-butenyl, 3E-butenyl, 3E-pentenyl, in particular vinyl.

The individual compounds, for example of the formulae II and III or their subformulae, or alternatively other compounds which can be used in the SLCDs according to the invention, are either known or can be prepared analogously to known compounds.

Preferred liquid-crystal mixtures comprise one or more compounds of component B, preferably from 10 to 65%. The compounds of group B are distinguished, in particular, by their low rotational viscosity values γ1.

Component B preferably, in addition to one or more compounds of the formula IB, comprises one or more compounds selected from the group consisting of the compounds of the formulae IV1 to IV9:

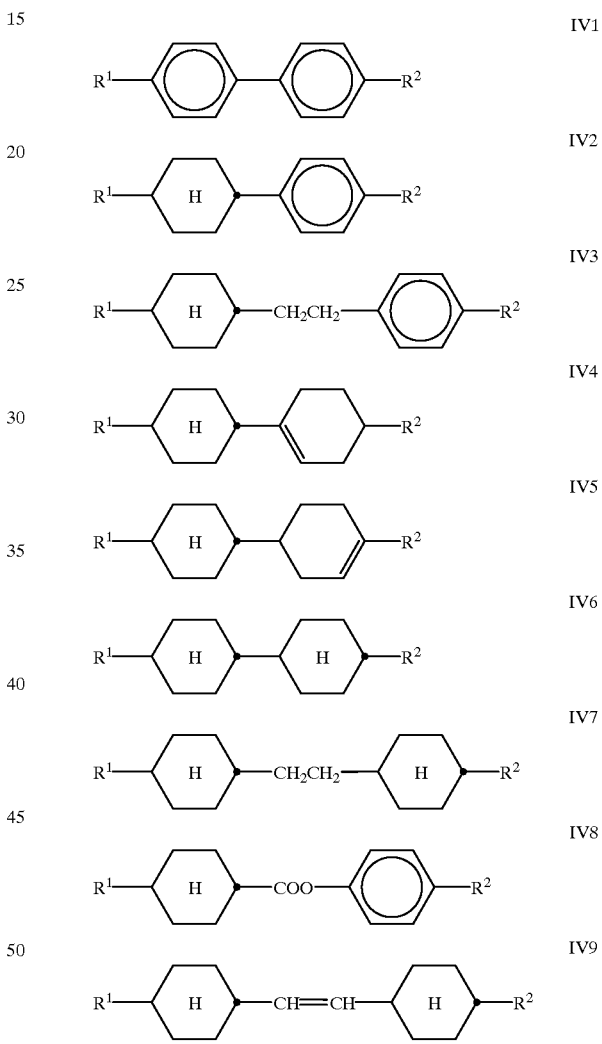

in which $R^1$ and $R^2$ are as defined for R.

Component B additionally comprises one or more compounds selected from the group consisting of the compounds of the formulae IV10 to IV24:

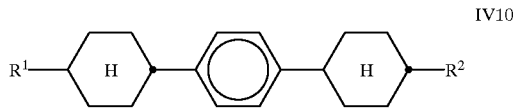

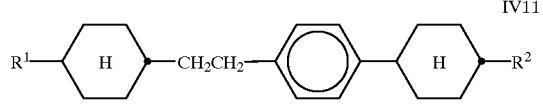
IV11

IV12

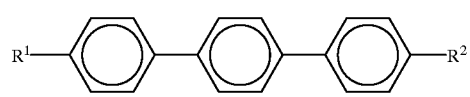
IV13

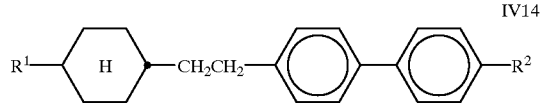
IV14

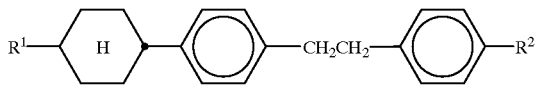
IV15

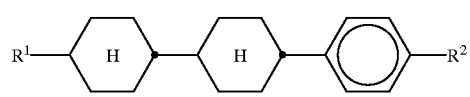
IV16

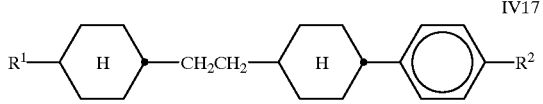
IV17

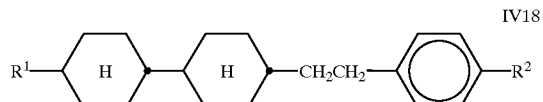
IV18

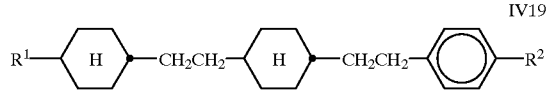
IV19

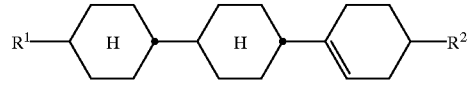
IV20

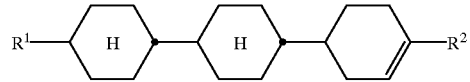
IV21

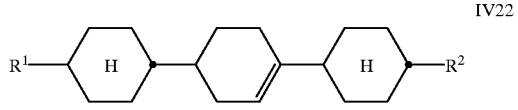
IV22

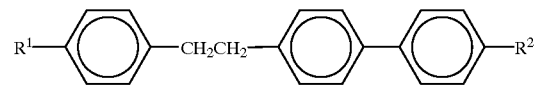
IV23

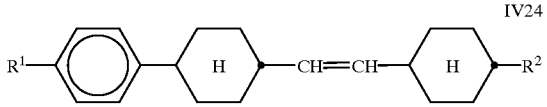
IV24 in which $R^1$ and $R^2$ are as defined for R, and the 1,4-phenylene groups in IV10 to IV19, IV23 and IV24 may each, independently of one another, also be monosubstituted or polysubstituted by fluorine.

Particular preference is given to mixtures comprising one or more compounds of the following formulae:

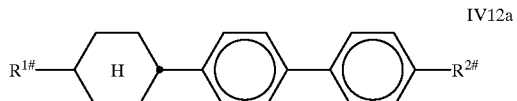
IV12a

IV16a in which $R^{1\#}$ is as defined for $R^3$, and $R^{2\#}$ is straight-chain alkyl having 1 to 4 carbon atoms.

In these compounds, $R^{1\#}$ is particularly preferably vinyl, 1E-propenyl, 1-butenyl, 2E-butenyl or 2E-pentenyl. $R^{2\#}$ is particularly preferably methyl, ethyl or propyl, in particular methyl or ethyl.

Component B, in addition to component IB, comprises one or more compounds selected from the group consisting of the compounds of the formula IV25 to IV31:

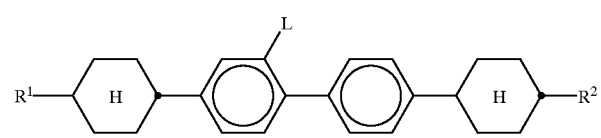
IV25

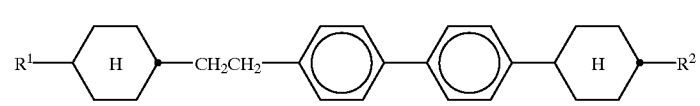
IV26

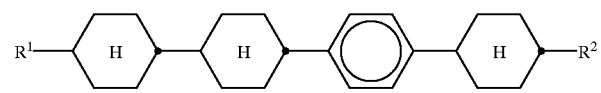
IV27

-continued

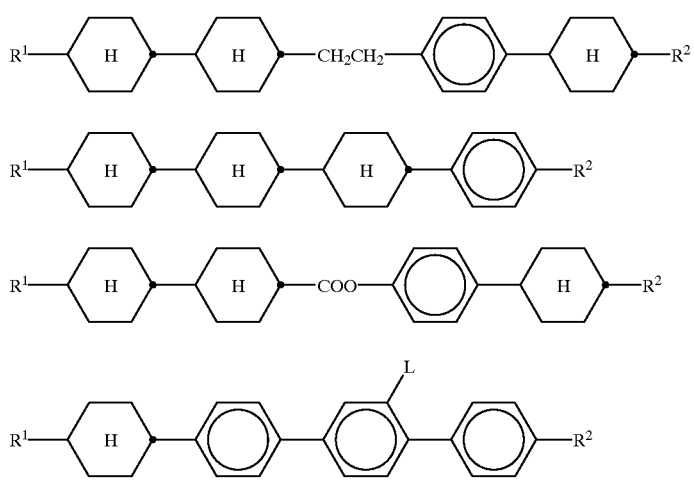

in which $R^1$ and $R^2$ are as defined for R, and L is F or H. The 1,4-phenylene groups in IV25 to IV31 may also each, independently of one another, be monosubstituted or polysubstituted by fluorine.

Particular preference is given to compounds of the formulae IV25 to IV31 in which $R^1$ is alkyl and $R^2$ is alkyl or alkoxy, in particular alkoxy, in each case having 1 to 7 carbon atoms. Preference is furthermore given to compounds of the formulae IV25 and IV31, in which L is F.

In the compounds of the formulae IV1 to IV30, $R^1$ and $R^2$ are particularly preferably straight-chain alkyl or alkoxy having 1 to 12 carbon atoms.

Component B optionally comprises one or more compounds selected from the group consisting of the compounds of the formulae VI and VII:

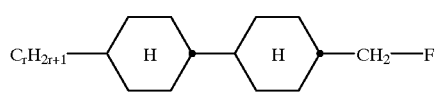 VI

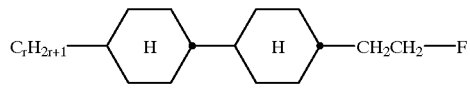 VII in which $C_rH_{2r+1}$ is a straight-chain alkyl group having up to 9 carbon atoms.

In a further preferred embodiment, the liquid-crystal mixtures, besides components A, B and C, additionally comprises one or more compounds selected from the group

 VIII

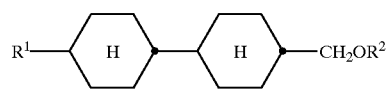 IX in which $R^1$ and $R^2$ are as defined above.

Furthermore preferred liquid-crystal mixtures comprise at least one component selected from the group consisting of the compounds of the formulae X to XIV:

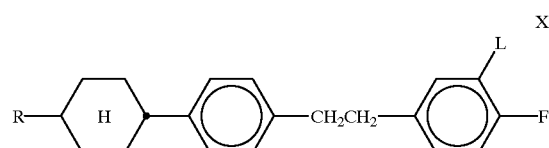 X

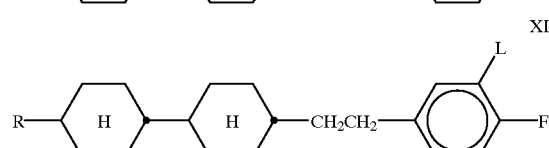 XI

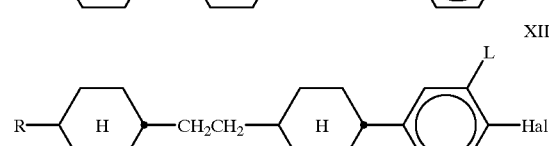 XII

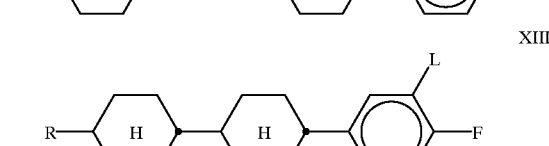 XIII

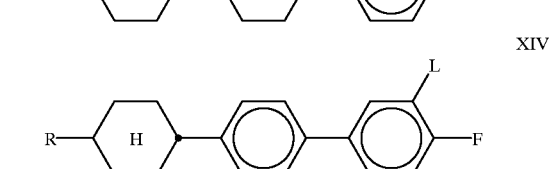 XIV in which Hal is F or Cl, L is H or F, and R is as defined above, in particular alkyl having 1 to 12 carbon atoms.

The liquid-crystal mixtures optionally comprise an optically active component C in such an amount that the ratio between the layer thickness (separation of the outer plates) and the natural pitch of the chiral nematic liquid-crystal mixture is greater than 0.2. For the component, a multiplicity of chiral dopants, some commercially available, is available to the person skilled in the art, for example such as cholesteryl nonanoate, S-811 from Merck KGaA, Darmstadt, FRG, and CB (BDH, Poole, UK). The choice of dopants is not crucial per se.

The proportion of the compounds of component C is preferably from 0 to 10%, in particular from 0 to 5%, particularly preferably from 0 to 3%.

In a particularly preferred embodiment, the mixtures according to the invention comprise from about 2 to 45%, in particular from 5 to 25%, of liquid-crystalline tolan compounds. This enables smaller layer thicknesses to be used, significantly shortening the response times. The tolan compounds are preferably selected from Group T consisting of the compounds of the formulae T1 and T2:

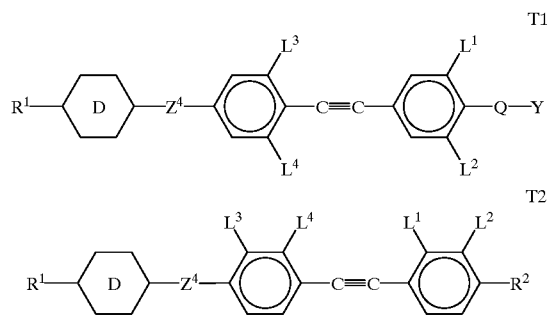

in which

is

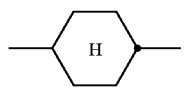

or

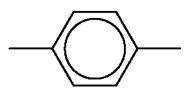

preferably

also

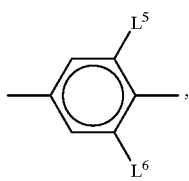

in the formula T1 and also

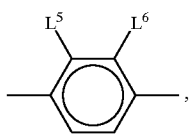

in the formula T2,
d is 0 or 1,
L1 to $L^6$ are each, independently of one another, H or F,
Q is —$CF_2$—, —CHF—, —$OCF_2$—, —OCHF— or a single bond,
Y is F or Cl,
$Z^4$ is —CO—O—, —$CH_2CH_2$— or a single bond, and
$R^1$ and $R^2$ are each as defined above.

Preferred compounds of the formula T1 conform to the subformulae T1a and T1b

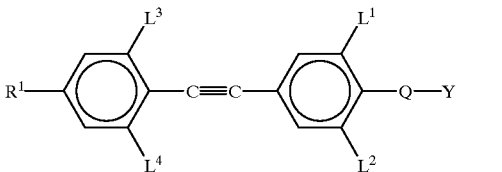

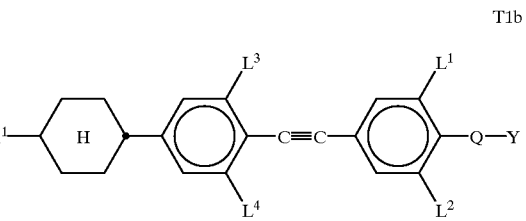

in which $L^1$ to $L^4$ are H or F, and Q-Y is F, Cl or $OCF_3$, in particular F or $OCF_3$.

Preferred compounds of the formula T2 conform to the subformulae T2a to T2g

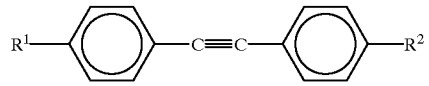

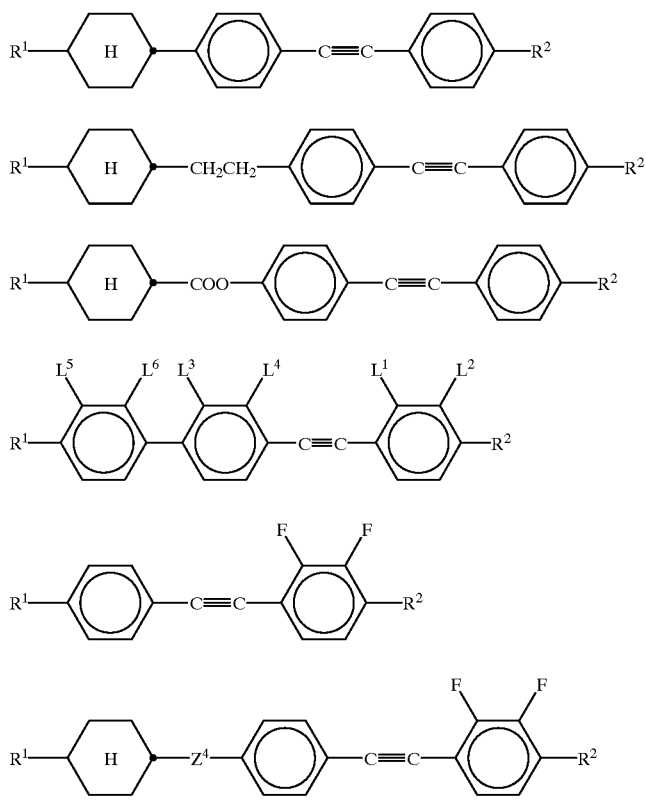

T2b

T2c

T2d

T2e

T2f

T2g in which $R^1$, $R^2$ and $Z^4$ are as defined above, and $L^1$ to $L^6$ are H or F.

Particularly preferred compounds of the formula T2e are those in which one, two or three of the radicals $L^1$ to $L^6$ are F and the others are H, where each of the rings of formula T2e contain one F at the most.

The proportion of compounds from the group T is preferably from 2 to 45%, in particular from 5 to 30%.

In a further particularly preferred embodiment, the mixtures according to the invention preferably comprise from about 5 to 20% of one or more compounds having a dielectric anisotropy of less than −2 (component D).

Component D preferably comprises one or more compounds containing the structural unit 2,3-difluoro-1,4-phenylene, for example compounds as described in DE-A 38 07 801, 38 07 861, 38 07 863, 38 07 864 or 38 07 908. Particular preference is given to tolans containing this structural unit, as described in International Patent Application PCT/DE 88/00133, in particular those of the formulae T2f and T2g.

Further known compounds of component D are, for example, derivatives of 2,3-dicyanohydroquinones or cyclohexane derivatives containing the structural unit

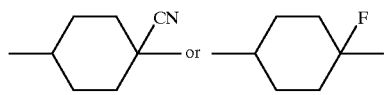

as described in DE-A 32 31 707 or DE-A 34 07 013 respectively.

The liquid-crystal mixture according to the invention preferably comprises one or more compounds selected from group B1 consisting of compounds of the formulae B1I to B1IV:

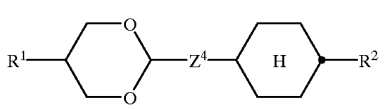

B1I

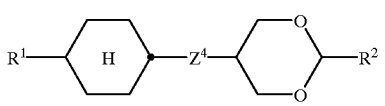

B1II

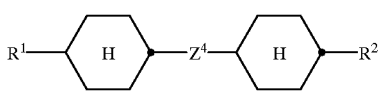

B1III

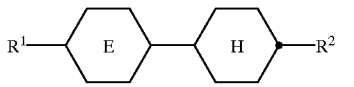

B1IV in which $R^1$, $R^2$ and $Z^4$ are as defined above and

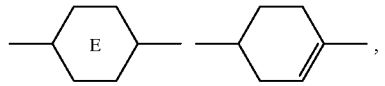

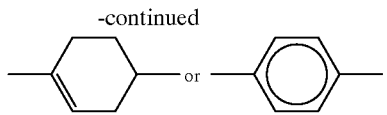

and/or at least one compound selected from consisting of compounds of the formulae B2I to B2III:

B2I
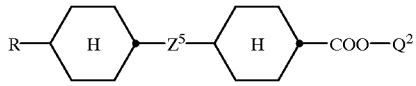

B2II
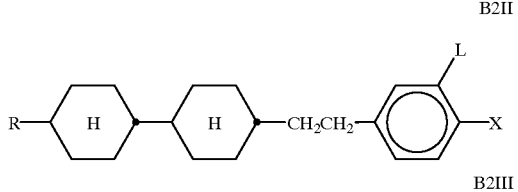

B2III in which
R is as defined above,
$Z^5$ is —CH$_2$CH$_2$—, —CO—O— or a single bond,
$Q^2$ is

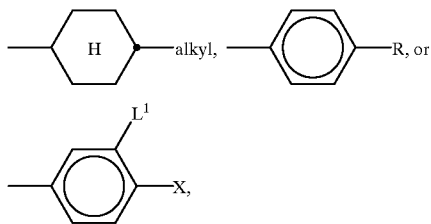

alkyl is an alkyl group having 1 to 9 carbon atoms,
X is CN or F, and
L is H or F,
and/or at least one compound selected from group B3 consisting of compounds of the formulae B3I to B3III:

B3I
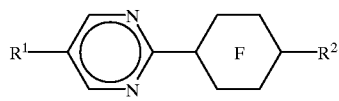

B3II
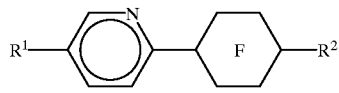

B3III
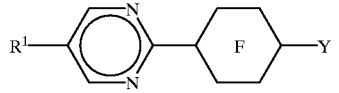

in which
$R^1$ and $R^2$, independently of one another, are as defined above,

Y is F or Cl, and

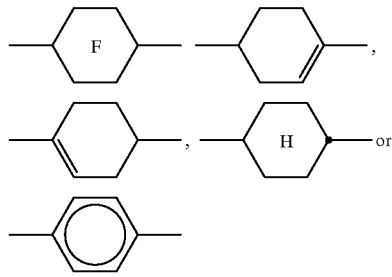

The proportion of the compounds from group B1 is preferably from 10 to 50%, in particular from 15 to 40%. Compounds of the formulae B1III and B1IV are preferred.

Particularly preferred compounds of group B1 are those of the following subformulae:

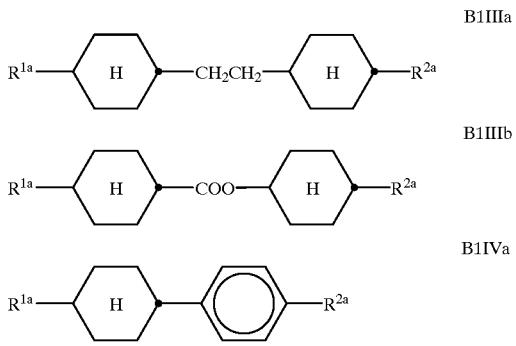

in which
$R^{1a}$ is CH$_3$—(CH$_2$)$_p$—, CH$_3$—(CH$_2$)$_p$—O—, CH$_3$—(CH$_2$)$_p$—O—CH$_2$—, trans—H—(CH$_2$)$_q$—CH=CH(CH$_2$CH$_2$)$_s$—CH$_2$O— or trans—H—(CH$_2$)$_q$—CH=CH—(CH$_2$CH$_2$)$_s$—,
$R^{2a}$ is CH$_3$—(CH$_2$)$_p$,
p is 1,2,3 or 4
q is 0,1,2, or 3, and
s is 0 or 1.

The proportion of the compounds of the abovementioned subformulae B1IIIa and B1IIIb together with the compounds of the formula IB1 is preferably from about 5 to 45%, particularly preferably from about 10 to 35%.

The proportion of the compounds of the subformula B1IVa or of the compounds of the formula B1IV is preferably from about 5 to 40%, particularly preferably from about 10 to 35%.

In a particularly preferred embodiment, the mixtures simultaneously comprise compounds of the formulae B1III and B1IV together with the compounds of the formulae IB1 and IB2, observing the total proportion for components from group B1.

If compounds of the formulae B1I and/or B1III are present, $R^1$ and $R^2$ are preferably each, independently of one another, n-alkyl having 1 to 7 carbon atoms or (trans)-n-alkenyl having 3 to 7 carbon atoms. Z is preferably a single bond.

Preference is furthermore given to mixtures according to the invention which comprise one or more compounds of the formula B1IV in which

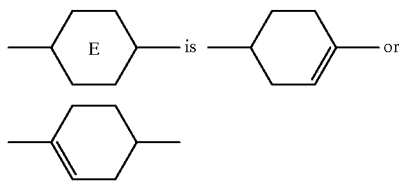

is and $R^1$ and $R^2$ have one of the preferred meanings indicated above, and are particularly preferably n-alkyl having 1 to 7 carbon atoms.

In all cases, the total proportion of components from group B1 is observed.

The proportion of the compounds from group B2 is preferably from about 5 to 45%, in particular from 5 to 20%. The proportion (preferred ranges) for B2I to B2III is as follows:

B2I: from about 5 to 30%, preferably from about 5 to 15%, sum of B2II and B2III: from about 5 to 25%, preferably from about 10 to 20%.

Preferred compounds from group B2 are shown below:

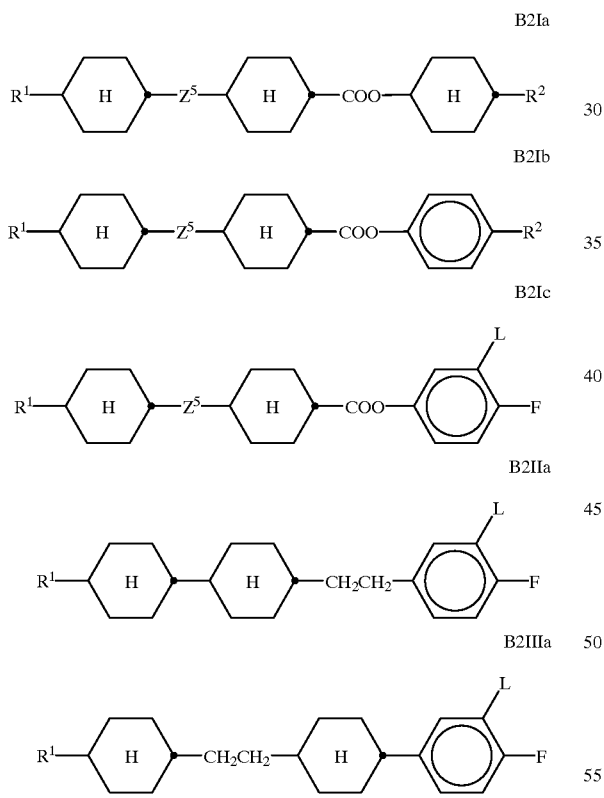

in which $R^1$, $R^2$, L and $Z^5$ are as defined above.

In these compounds, $R^1$ is preferably n-alkyl having 1 to 7 carbon atoms or (trans)-n-alkenyl having 3 to 7 carbon atoms, $Z^5$ is preferably a single bond, $R^2$ preferably has the preferred meaning given above for R or is fluorine, and L is preferably fluorine.

The mixtures according to the invention preferably comprise one or more compounds selected from the group consisting of B2Ic, B2IIa and B2IIIa in a total proportion of from about 5 to 35%.

In a particularly preferred embodiment, the mixtures according to the invention, in addition to B2Ic, B2IIa and B2IIIa (L=F), comprise further terminally fluorinated compounds, selected, for example, from the group consisting of

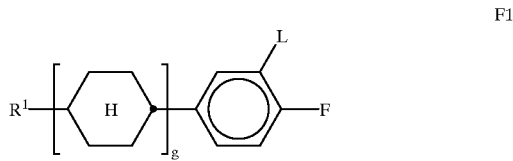

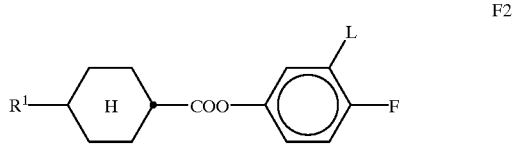

and/or polar heterocyclic compounds selected from the group consisting of

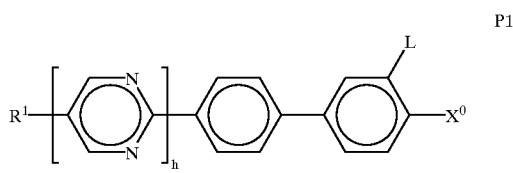

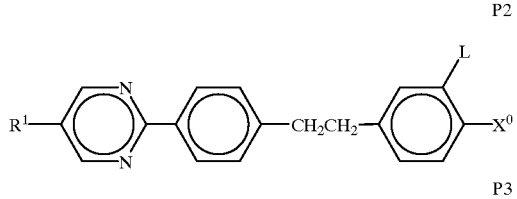

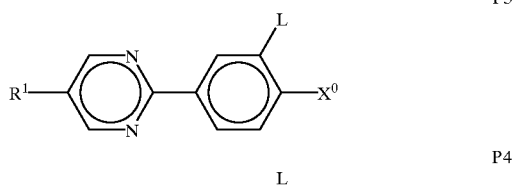

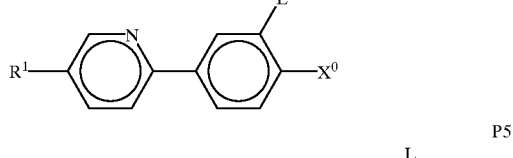

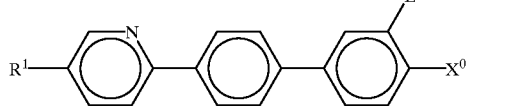

in which $R^1$ is preferably n-alkyl having 1 to 7 carbon atoms or (trans)-n-alkenyl having 3 to 7 carbon atoms, g is 1 or 2, h is 0 or 1, $X^0$ is F, Cl, $CF_3$, $-OCF_3$ or $-OCHF_2$, and L is H or F.

The total proportion of all terminally fluorinated compounds is preferably from about 5 to 65%, in particular from about 15 to 40%.

The proportion of compounds from group B3 is preferably from about 5 to 30%, particularly preferably from about 10 to 20%. $R^1$ is preferably n-alkyl or n-alkoxy, in each case having 1 to 9 carbon atoms.

However, it is also possible to employ analogous compounds containing alkenyl or alkenyloxy groups. Compounds of the formula B3I are preferred.

The term "alkenyl" in the definition of R, $R^1$, $R^2$, $R^3$ and $R^4$ covers straight-chain and branched alkenyl groups, having 2–12 carbon atoms in the case of R, $R^1$ and $R^2$ and having 2–7 carbon atoms in the case of $R^3$ and $R^4$, in particular the straight-chain groups. Particularly preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl.

Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The mixtures according to the invention comprise compounds of the formulae IA and IB and preferably compounds from at least one of groups B1, B2 and B3. They preferably comprise one or more compounds from group B1 and one or more compounds from group B2 and/or B3.

In a preferred embodiment, the liquid-crystalline media according to the invention comprise 3, 4, 5 or 6 compounds of the formulae IA and/or IB; the content of these compounds is generally from 10 to 60% by weight, preferably from 15 to 50% by weight, based on the total.

In a further preferred embodiment, the mixtures comprise one or more compounds of the following formulae

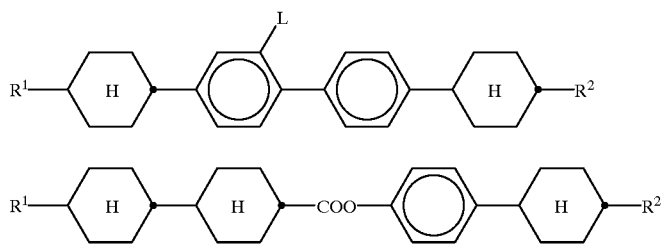

in which $R^1$, $R^2$ and L have the preferred meanings given under compounds of component B. The proportion of these compounds in the liquid-crystal mixtures is preferably from 0 to 45%, in particular from 5 to 30%;

one or more, in particular 1, 2, 3 or 4, compounds selected from the compounds of the formulae IIIb, IIId, IIIf, IIIh, IIII, IIIm, IIIs, IIIt and IIIu;

at least two compounds selected from the compounds of the formulae IIb1, IIb2, IIc1 and IIc2. The proportion of these compounds in the liquid-crystal mixtures is preferably from 0 to 60% by weight, particularly from 10 to 45%;

one or more compounds of the formula T1 or T2, in particular one or more compounds of the formula T2a and/or R2b, where the proportion of these compounds in the liquid-crystal mixtures is preferably from 0 to 25%, in particular from 1 to 15%.

Further particularly preferred embodiments relate to liquid-crystal mixtures comprising at least two compounds of the formula AI or AII;

one or more compounds in which R is a trans-alkenyl group or trans-alkenyloxy group;

one or more compounds selected from the following group:

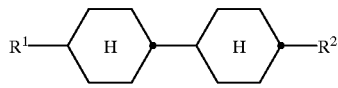

IV6

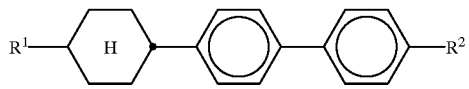

IV12

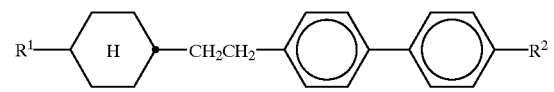

IV14 in which $R^1$, $R^2$ and L have the preferred meanings given under compounds of component B. The 1,4-phenylene group in the abovementioned compounds can also be substituted by fluorine;

one or more compounds of the formulae

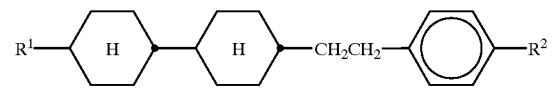

IV18

IV25

IV30

-continued

XV

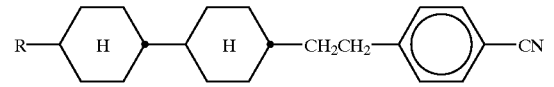

in which R, $R^1$ and $R^2$ are as defined above.

In particular when used in SLCDs having high layer thicknesses, the mixtures according to the invention are distinguished by very low overall response times ($=t_{on}+t_{off}$). Low overall response times are an important criterion, in particular, in SLCDs for use as displays in laptops in order to be able to display cursor movements without interference.

The liquid-crystal mixtures used in the STN and TN cells according to the invention are dielectrically positive with $\Delta\epsilon \geq 1$. Particular preference is given to liquid-crystal mixtures where $\Delta\epsilon \geq 3$ and very particularly to those where $\Delta\epsilon \geq 5$.

The liquid-crystal mixtures according to the invention have favourable values for the threshold voltage $V_{10/0/20}$ and for the rotational viscosity $\gamma_1$. If the value for the optical path difference d.$\Delta$n is specified, the value for the layer thickness d is determined by the optical anisotropy Δn. In particular at relatively high values for d.Δn, the use of liquid-crystal mixtures according to the invention having a relatively high value for the optical anisotropy is generally preferred since the value for d can then be chosen to be relatively small, which results in more favourable values for the response times. However, liquid-crystal displays according to the invention which contain liquid-crystal mixtures according to the invention having relatively small values for Δn are also characterized by advantageous values for the response times.

The liquid-crystal mixtures according to the invention are furthermore characterized by advantageous values for the steepness of the electrooptical characteristic line and can be operated at high multiplex rates, in particular at temperatures above 20° C. In addition, the liquid-crystal mixtures according to the invention have high stability and favourable values for the electrical resistance and the frequency dependence of the threshold voltage. The liquid-crystal displays according to the invention have a broad operating temperature range and good angle dependence of the contrast.

The construction of the liquid-crystal display elements according to the invention from polarizers, electrode baseplates and electrodes with a surface treatment such that the preferential alignment (director) of the liquid-crystal molecules in each case adjacent thereto is usually twisted by a value of from 160° to 720° from one electrode to the next, corresponds to the structure which is conventional for display elements of this type. The term conventional structure here is broadly drawn and also includes all derivatives and modifications of the TN and STN cell, in particular also matrix display elements, and display elements which contain additional magnets.

The surface tilt angle at the two outer plates may be identical or different. Identical tilt angles are preferred. Preferred TN displays have pretilt angles between the longitudinal axis of the molecules at the surface of the outer plates and the outer plates of from 0° to 7°, preferably from 0.010 to 5°, in particular from 0.1 to 2°. In STN displays, the pretilt angle is from 1° to 30°, preferably from 1° to 12°, in particular from 3° to 10°.

The twist angle of the TN mixture in the cell has a value of between 22.50 and 170°, preferably between 45° and 130°, in particular between 80° and 115°. The twist angle of the STN mixture in the display from alignment layer to alignment layer has a value of between 100° and 600°, preferably between 170° and 300°, in particular between 180° and 270°.

The liquid-crystal mixtures which can be used according to the invention are prepared in a manner which is known per se. In general, the desired amount of the components used in a lesser amount is dissolved in the components making up the principal constituent, expediently at elevated temperature. It is also possible to mix solutions of the components in an organic solvent, for example in acetone, chloroform or methanol, and, after mixing, to remove the solvent again, for example by distillation.

The dielectrics may also contain further additives which are known to a person skilled in the art and are described in the literature. For example, 0–15% of pleochroic dyes may be added.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding German Application No. 197 32 502.5, filed Jul. 29, 1997 is hereby incorporated by reference.

In the present application and in the examples below, the structures of the liquid-crystal compounds are indicated by acronyms, the transformation into chemical formulae taking place in accordance with tables A and B below. All radicals $C_nH_{2n+1}$ and $C_mH_{2m+1}$ are straight-chain alkyl radicals having n and m carbon atoms respectively. The alkenyl radicals have the transconfiguration. The coding in Table B is self-evident. In Table A, only the acronym for the parent structure is given. In individual cases, the acronym for the parent structure is followed, separated by a dash, by a code for the substituents $R^1R^2$, $L^1$, $L^2$ and $L^3$:

| Code for $R^1$, $R^2$, $L^1$, $L^2$, $L^3$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nOm | $OC_nH_{2n+1}$ | $C_mH_{2m+1}$ | H | H | H |
| nO.m | $C_nH_{2n+1}$ | $OC_mH_{2m+1}$ | H | H | H |
| n | $C_nH_{2n+1}$ | CN | H | H | H |
| nN.F | $C_nH_{2n+1}$ | CN | H | H | F |
| nN.F.F | $C_nH_{2n+1}$ | CN | H | F | F |
| nF | $C_nH_{2n+1}$ | F | H | H | H |
| nOF | $OC_nH_{2n+1}$ | F | H | H | H |
| nCl | $C_nH_{2n+1}$ | Cl | H | H | H |
| nF.F | $C_nH_{2n+1}$ | F | H | H | F |
| nmF | $C_nH_{2n+1}$ | $C_mH_{2m+1}$ | F | H | H |
| nCF$_3$ | $C_nH_{2n+1}$ | CF$_3$ | H | H | H |
| nOCF$_3$ | $C_nH_{2n+1}$ | OCF$_3$ | H | H | H |
| n-Am | $C_nH_{2n+1}$ | —C≡C—$C_mH_{2m+1}$ | H | H | H |
| n-AN | $C_nH_{2n+1}$ | —C≡C—CN | H | H | H |
| n-Vm | $C_nH_{2n+1}$ | —CH=CH—$C_mH_{2m+1}$ | H | H | H |
| nV-Vm | $C_nH_{2n+1}$—CH=CH— | —CH=CH—$C_mH_{2m+1}$ | H | H | H |

The TN and STN displays preferably contain liquid-crystalline mixtures composed of one or more compounds from Tables A and B.

TABLE A ($L^1$, $L^2$, $L^3$ = H or F)

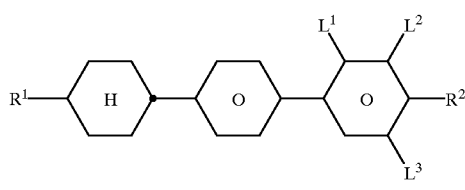

BCH

TABLE A-continued
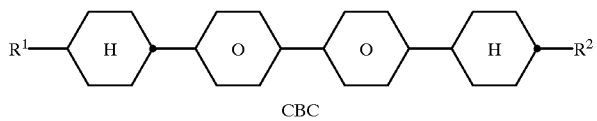
CBC
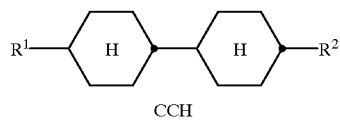
CCH
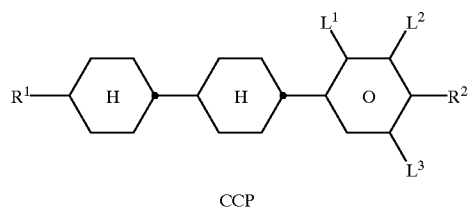
CCP
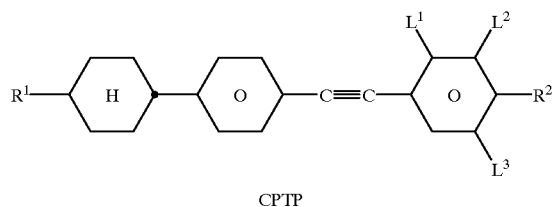
CPTP
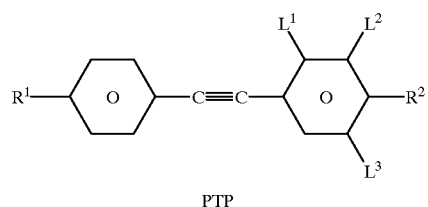
PTP
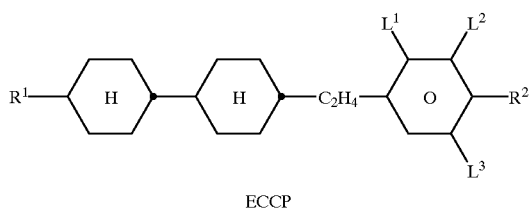
ECCP
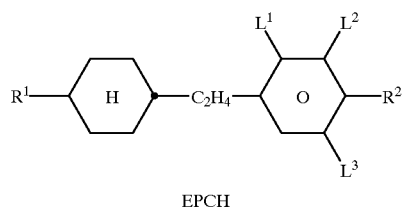
EPCH
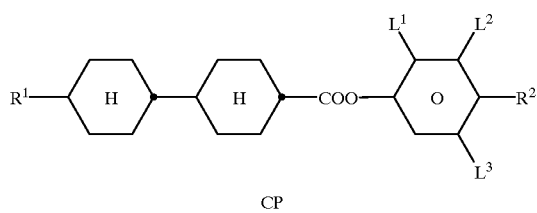
CP TABLE A-continued
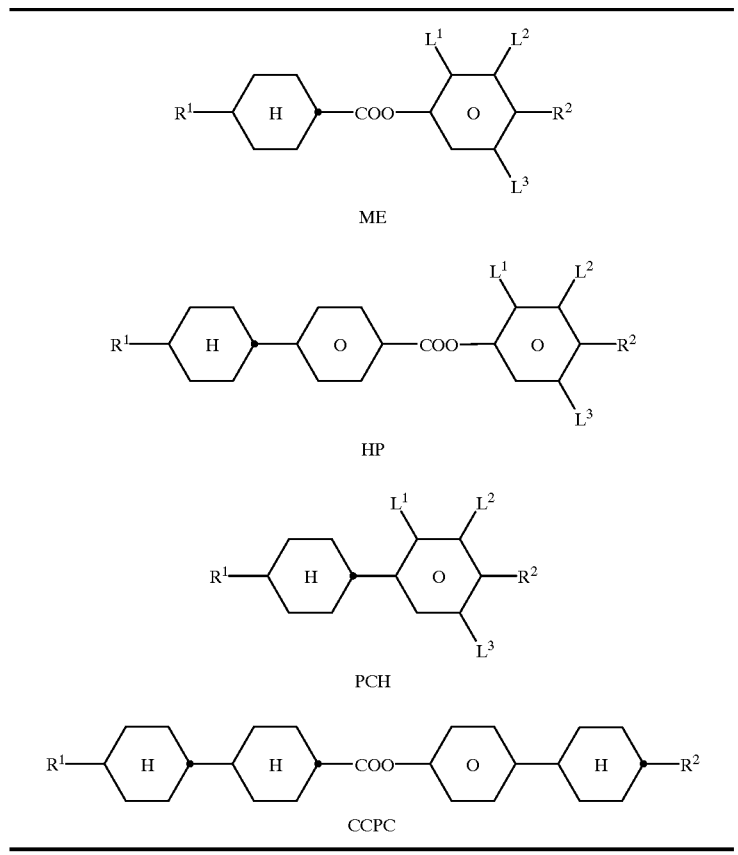
TABLE B
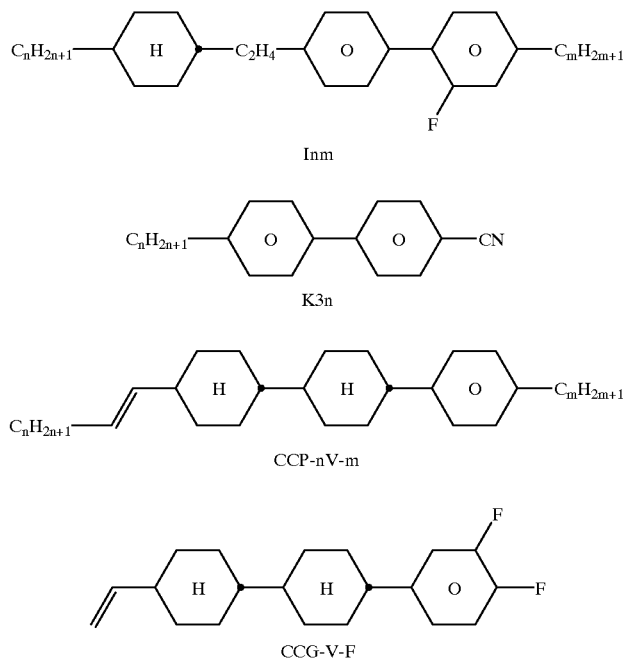

TABLE B-continued

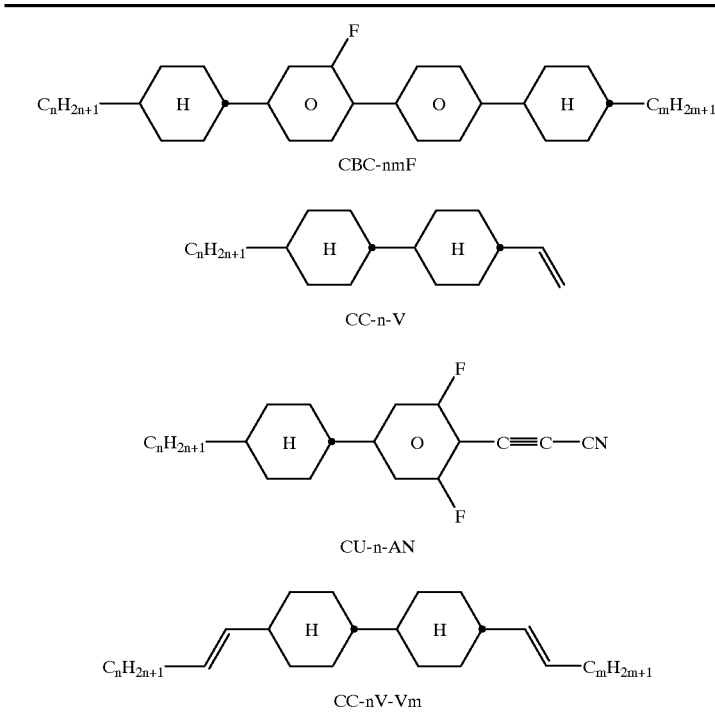

The examples below are intended to illustrate the invention without representing a limitation.

The following abbreviations are used:
S-N smectic-nematic phase transition temperature
N-I nematic-isotropic phase transition temperature
c.p. clearing point
visc. rotational viscosity (mPa.s)
$\Delta n$ optical anisotropy (589 nm, 20° C.)
$t_{on}$ time from switching on until 90% of the maximum contrast is achieved
$t_{off}$ time from switching off until 10% of the maximum contrast is achieved
$V_{90}/V_{10}$ steepness
$V_{op}$ operating voltage
$t_{ave}$ $t_{on}+t_{off}/2$ (average response time).

Above and below, all temperatures are given in ° C. Percentatges are percent by weight. The values for the response times and viscosities relate to 20° C., unless stated otherwise. The response time is, unless stated otherwise, the average value $t_{ave}$ of the switch-on and switch-off times.

The SLCD is, unless stated otherwise, addressed in multiplex operation (multiplex ratio 1:16, bias 1:5).

EXAMPLE 1

An STN mixture comprising

| | | | |
|---|---|---|---|
| ME2N.F | 10.00% | Clearing point: | 102° C. |
| ME3N.F | 10.00% | $\Delta n$: | 0.1377 |
| ME4N.F | 13.00% | Twist: | 240° |
| CU-3-AN | 12.00% | $V_{10}$ | 1.202 V |
| CC-5-V | 18.00% | $V_{90}/V_{10}$ | 1.062 |
| CCG-V-F | 13.00% | $V_{op}$ | 4.6 V |
| CPTP-301 | 3.00% | Response time: | 168 ms |
| CCPC-33 | 6.00% | | |
| CCPC-34 | 5.00% | | |

EXAMPLE 1-continued

An STN mixture comprising

| | |
|---|---|
| CCPC-35 | 5.00% |
| CBC-33 | 5.00% |

EXAMPLE 2

An STN mixture comprising

| | | | |
|---|---|---|---|
| ME2N.F | 10.00% | Clearing point: | 97° C. |
| ME3N.F | 10.00% | $\Delta n$: | 0.1382 |
| ME4N.F | 14.00% | Twist: | 240° |
| CU-3-AN | 12.00% | $V_{10}$ | 1.229 V |
| CC-V-V1 | 28.00% | $V_{90}/V_{10}$ | 1.044 |
| CPTP-301 | 2.00% | $V_{op}$: | 4.6 V |
| CCPC-33 | 6.00% | Response time: | 141 ms |
| CCPC-34 | 6.00% | | |
| CCPC-35 | 6.00% | | |
| CBC-33 | 3.00% | | |
| CBC-53 | 3.00% | | |

EXAMPLE 3

An STN mixture comprising

| | | | |
|---|---|---|---|
| ME2N.F | 10.00% | Clearing point: | 102.5° C. |
| ME3N.F | 10.00% | $\Delta n$: | 0.1403 |
| ME4N.F | 4.00% | Twist: | 240° |
| CU-2-AN | 10.00% | $V_{10}$ | 1.25 V |
| CU-3-AN | 11.00% | $V_{90}/V_{10}$ | 1.052 |
| CC-5-V | 18.00% | $V_{op}$ | 4.6 V |
| CCG-V-F | 13.00% | Response time: | 155 ms |

EXAMPLE 3-continued

An STN mixture comprising

| | |
|---|---|
| CPTP-301 | 3.00% |
| CCPC-33 | 6.00% |
| CCPC-34 | 5.00% |
| CCPC-35 | 5.00% |
| CBC-33 | 5.00% |

EXAMPLE 4

An STN mixture comprising

| | | | |
|---|---|---|---|
| ME2N.F | 10.00% | Clearing point: | 99.5° C. |
| ME3N.F | 10.00% | Δn: | 0.1383 |
| ME4N.F | 4.00% | Twist: | 240° |
| CU-2-AN | 11.00% | $V_{10}$ | 1.30 V |
| CU-3-AN | 11.00% | $V_{90}/V_{10}$ | 1.063 |
| CC-5-V | 18.00% | $V_{op}$ | 4.6 V |
| CCP-V-1 | 13.00% | Response time: | 131 ms |
| CCP-V2-1 | 7.00% | | |
| CCPC-33 | 6.00% | | |
| CCPC-34 | 5.00% | | |
| CBC-33 | 5.00% | | |

EXAMPLE 5

An STN mixture comprising

| | | | |
|---|---|---|---|
| CU-5-AN | 10.00% | Clearing point: | 102.5° C. |
| CU-4-AN | 10.00% | Δn: | 0.1467 |
| CU-3-AN | 15.00% | Twist: | 240° |
| CU-2-AN | 15.00% | $V_{10}$ | 1.52 V |
| CC-5V | 19.00% | $V_{90}/V_{10}$ | 1.048 |
| CCP-V-1 | 12.00% | $V_{op}$ | 4.6 V |
| CCP-V2-1 | 7.00% | Response time: | 99 ms |
| CCPC-33 | 4.00% | | |
| CCPC-34 | 4.00% | | |
| CCPC-35 | 4.00% | | |

What is claimed is:

1. A supertwist liquid-crystal display comprising two outer plates which, together with a frame, form a cell,
   a nematic liquid-crystal mixture of positive dielectric anisotropy which is present in the cell,
   electrode layers with alignment layers on the insides of the outer plates,
   a pretilt angle between the longitudinal axis of the molecules at the surface of the outer plates and the outer plates of from 0 degree to 30 degrees, and
   a twist angle of the liquid-crystal mixture in the cell from alignment layer to alignment layer with a value of between 22.5° and 600°,
   wherein the nematic liquid-crystal mixture comprises
   a) 20–90% by weight of a liquid-crystalline component A consisting of one or more compounds having a dielectric anisotropy of greater than +1.5;
   b) 10–80% by weight of a liquid-crystalline component B consisting of one or more compounds having a dielectric anisotropy of between −1.5 and +1.5;
   c) 0–20% by weight of a liquid-crystalline component D consisting of one or more compounds having a dielectric anisotropy of below −1.5, and
   d) an optically active component C in such an amount that the ratio between the layer thickness (separation of the outer plates) and the natural pitch of the chiral nematic liquid-crystal mixture is from about 0.2 to 1.3, wherein component A comprises at least one compound of the formula IA

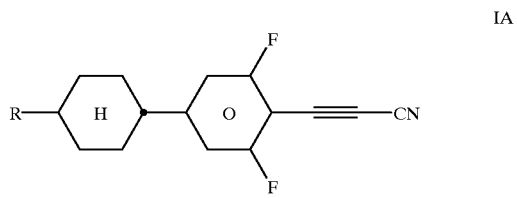

in which

R is an alkyl, alkoxy or alkenyl group having 1 to 12 carbon atoms, in which, in addition, one or two non-adjacent $CH_2$ groups are optionally replaced by —O—, —CH=CH—, —CO—, —OCO— or —COO— in such a way that O atoms are not linked directly to one another, and component B comprises at least one compound of the formula IB

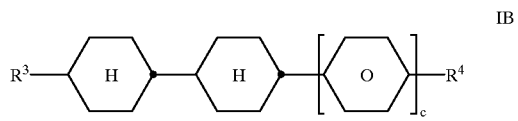

in which $R^3$ is an alkenyl group having 2 to 7 carbon atoms,
$R^4$ independently has the meaning of R or $R^3$ and
c is 0 or 1.

2. A liquid-crystal display according to claim 1, wherein component B comprises at least one compound of the following formulae:

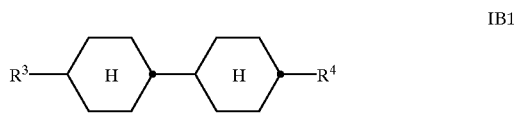

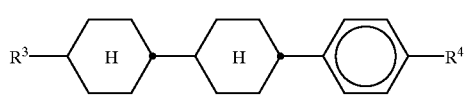

in which $R^3$ is 1E-alkenyl or 3E-alkenyl having 2 to 7 carbon atoms, and $R^4$ is as defined for R in the formula IA.

3. A liquid-crystal display according to claim 1, wherein component B comprises at least one of the following compounds:

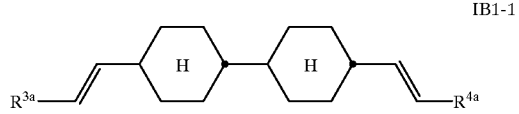

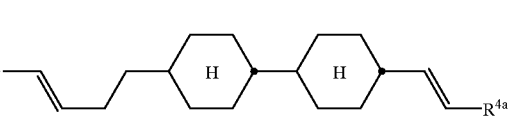

-continued

IB1-3

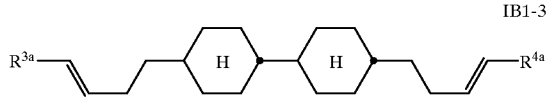

in which $R^{3a}$ and $R^{4a}$ are each, independently of one another, H, $CH_3$, $C_2H_5$ or $n\text{-}C_3H_7$.

4. A liquid-crystal display according to claim 1, wherein component A additionally comprises, at least one compound of the formulae II and/or III

II

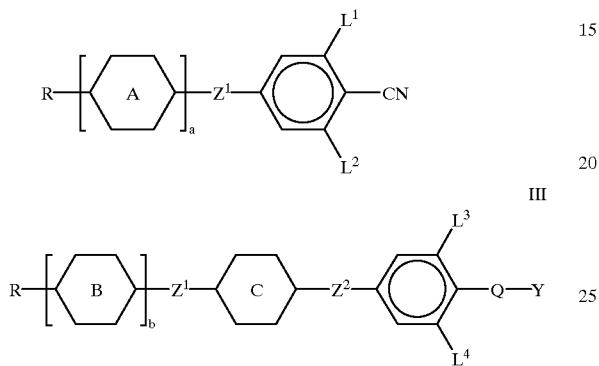

III in which

R is an alkyl, alkoxy or alkenyl group having 1 to 12 carbon atoms, in which, in addition, one or two non-adjacent $CH_2$ groups are optionally replaced by —O—, —CH=CH—, —CO—, —OCO— or —COO— in such a way that O atoms are not linked directly to one another,

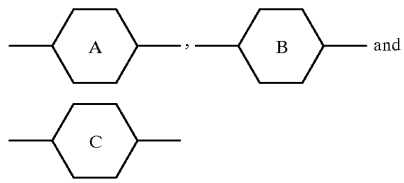
and

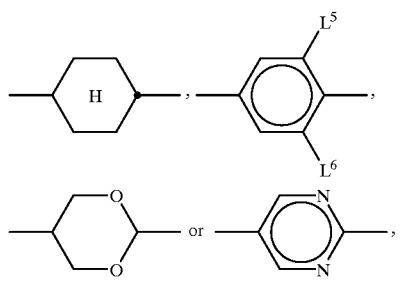

are each, independently of one another,

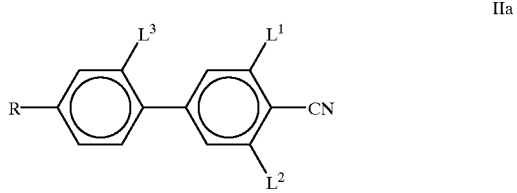

$L^1$ to $L^6$ are each, independently of one another, H or F,
$Z^1$ is —COO—, —$CH_2CH_2$— or a single bond,
$Z^2$ is —$CH_2CH_2$—, —COO—, —C≡C— or a single bond,
Q is —$CF_2$—, —CHF—, —$OCF_2$—, —OCHF— or a single bond,
Y is F or Cl a is 1 or 2, and
b is 0 or 1.

5. A liquid-crystal display according to claim 1, wherein component A comprises at least one compound of the following formulae:

IIa

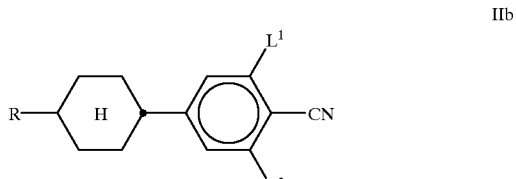

IIb

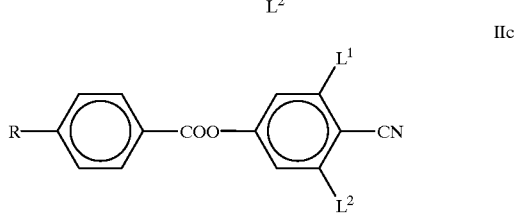

IIc

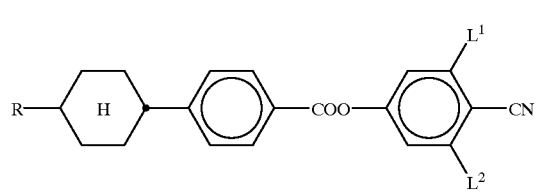

IIf

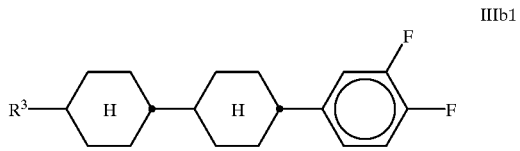

where R is as defined above and $L^1$, $L^2$ and $L^3$ are H or F.

6. A liquid-crystal display according claim 1, wherein component A comprises one or more compounds of the following formula:

IIIb1

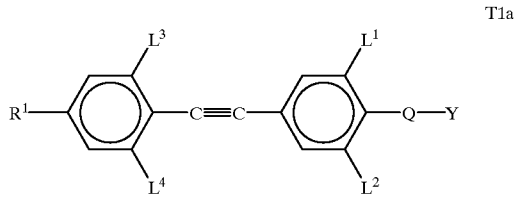

in which $R^3$ is 1E-alkenyl or 3E-alkenyl having 2 to 7 carbon atoms.

7. A liquid-crystal display according to claim 1, wherein component A comprises one or more of the following compounds:

T1a

-continued

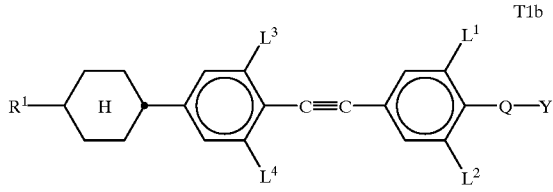
T1b in which $L^1$ to $L^4$ are H or F and Q-Y is F, Cl or $OCF_3$.

8. The liquid-crystal display of claim 7, wherein Q-Y is F or $OCF_3$.

9. A liquid-crystal display according to claim 1, wherein component B comprises one or more compounds selected from the group consisting of T2a to T2e:

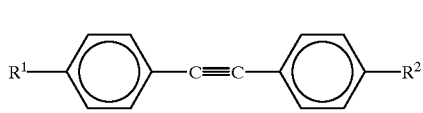
T2a

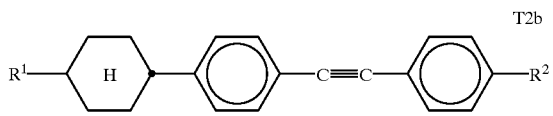
T2b

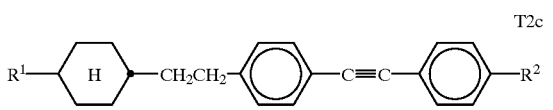
T2c

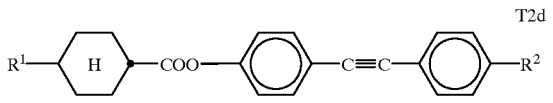
T2d

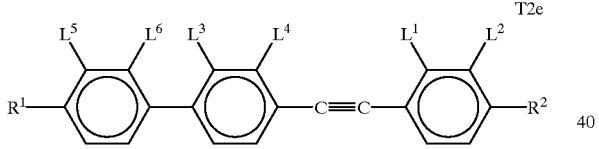
T2e in which $R^1$ and $R^2$ are as defined for R in the formula IA, and one, two or three radicals $L^1$ to $L^5$ are F and the others are H, where each of the rings of formula T2e contain one F at the most.

10. A liquid-crystal display according to claim 1, wherein component B additionally comprises one or more compounds of the formulae IV25 to IV30:

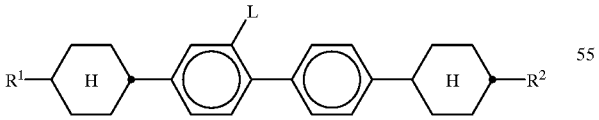
IV25

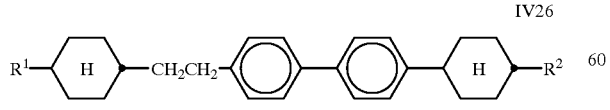
IV26

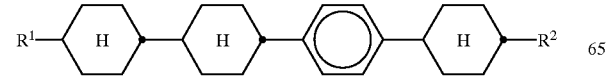
IV27

-continued

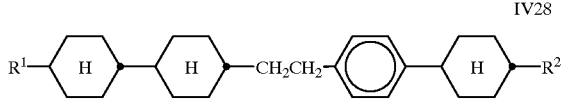
IV28

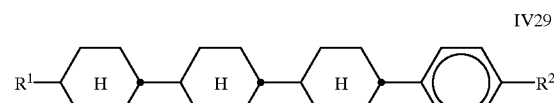
IV29

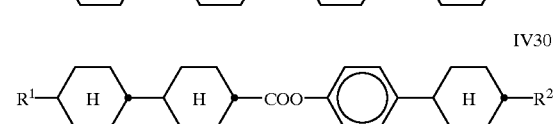
IV30

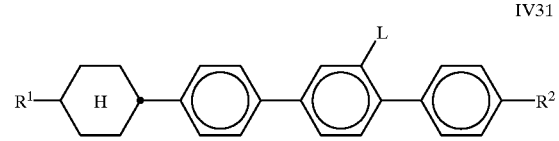
IV31 in which $R^1$ and $R^2$ each, independently of one another, have the meaning given for R in the formula IA, and L is H or F.

11. A liquid-crystal display according to claim 1, wherein component B additionally comprises one or more compounds of the formula IV1 to IV24:

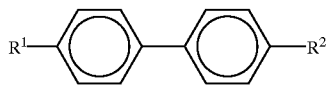
IV1

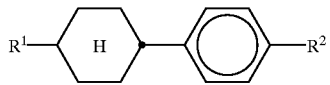
IV2

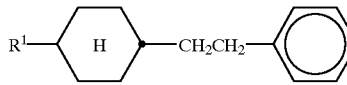
IV3

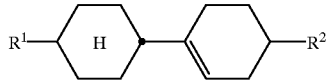
IV4

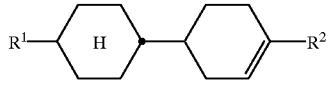
IV5

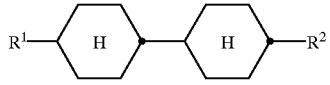
IV6

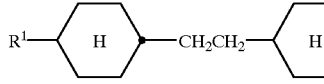
IV7

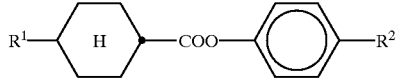
IV8

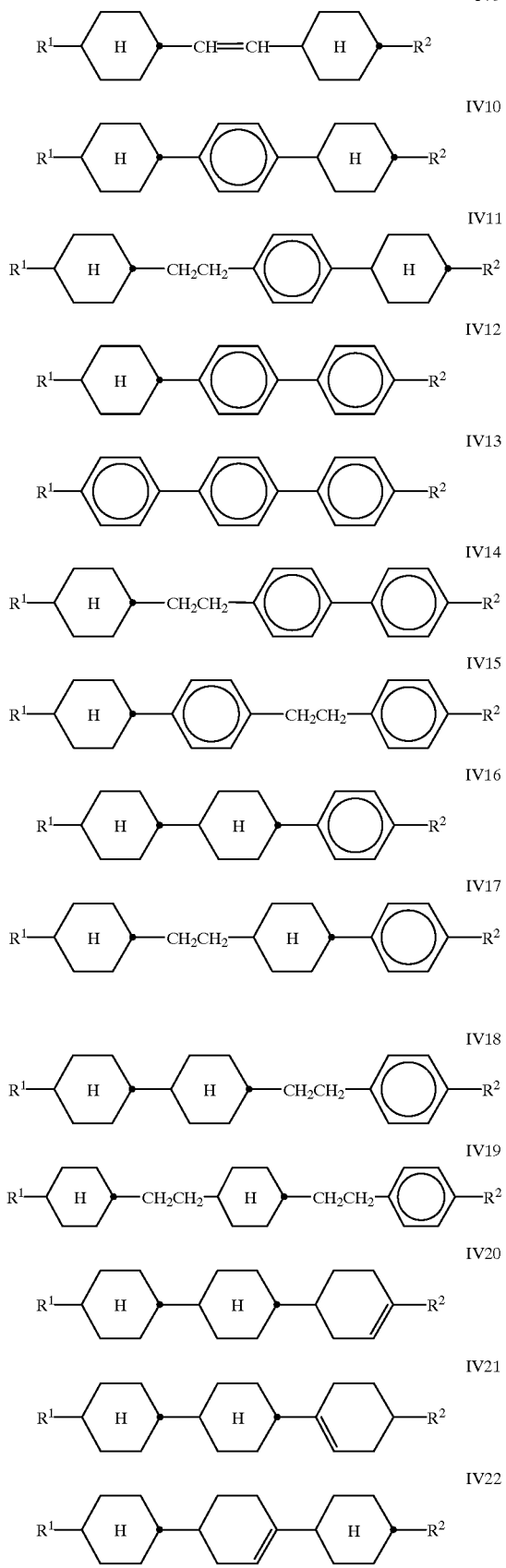

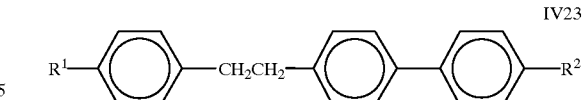

in which $R^1$ and $R^2$ are each, independently of one another, as defined for R in formula IA.

12. A liquid-crystal mixture which comprises a) 20-90% by weight of a liquid-crystalline component A consisting of one or more compounds having a dielectric anisotropy of greater than +1.5;

b) 10–80% by weight of a liquid-crystalline component B consisting of one or more compounds having a dielectric anisotropy of between −1.5 and +1.5;

c) 0–20% by weight of a liquid-crystalline component D consisting of one or more compounds having a dielectric anisotropy of below −1.5, and d) an optically active component C in such an amount that the ratio between the layer thickness (separation of the outer plates) and the natural pitch of the chiral nematic liquid-crystal mixture is from about 0.2 to 1.3, wherein component A comprises at least one compound of the formula IA

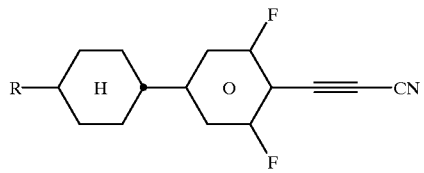

in which

R is an alkyl, alkoxy or alkenyl group having 1 to 12 carbon atoms, in which, in addition, one or two non-adjacent $CH_2$ groups are optionally replaced by —O—, —CH=CH—, —CO—, —OCO— or —COO—in such a way that O atoms are not linked directly to one another, and component B comprises at least one compound of the formula IB

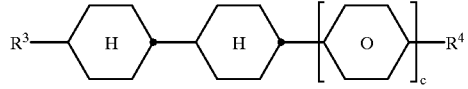

in which $R^3$ is an alkenyl group having 2 to 7 carbon atoms, $R^4$ independently has the meaning of R or $R^3$ and c is 0 or 1.

* * * * *